J. GREENHOUGH.
MACHINE OR APPLIANCE FOR PLANING, SLOTTING, AND LIKE OPERATIONS.
APPLICATION FILED JAN. 7, 1918.

1,281,559.

Patented Oct. 15, 1918.

INVENTOR,
JAMES GREENHOUGH,

By
ATTORNEYS.

UNITED STATES PATENT OFFICE.

JAMES GREENHOUGH, OF LIVERPOOL, ENGLAND.

MACHINE OR APPLIANCE FOR PLANING, SLOTTING, AND LIKE OPERATIONS.

1,281,559.　　　　Specification of Letters Patent.　　Patented Oct. 15, 1918.

Application filed January 7, 1918. Serial No. 210,604.

*To all whom it may concern:*

Be it known that I, JAMES GREENHOUGH, a subject of the King of England, residing at 81 Byron street, Liverpool, in the county of Lancaster, England, engineer, have invented certain new and useful New or Improved Machines or Appliances for Planing, Slotting, and like Operations, of which the following is a specification.

This invention relates to the machining of metal by hand, and has for its object to provide a machine or appliance for planing, slotting and like operations, adapted for application to a vise, whereby the work to be tooled is held; the construction of the machine being such that both reciprocal and lateral motion or traverse is or may be imparted to the tool holder.

I will describe my invention with the aid of the accompanying sheet of explanatory drawings, which illustrate by way of example only, one mode of embodying same; and it is to be clearly understood that I do not wish to confine myself to the precise details of construction and arrangement of parts illustrated, as various changes and modifications may be made to effect the end in view without departing from the spirit and scope of the invention.

In said drawings:—

Figure 2:
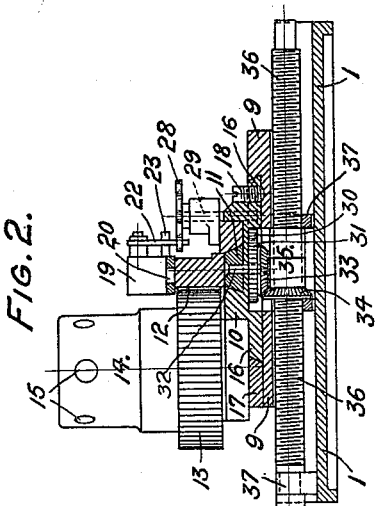
Fig. 2 is a section, taken at right angles to Fig. 1.
Figure 1:
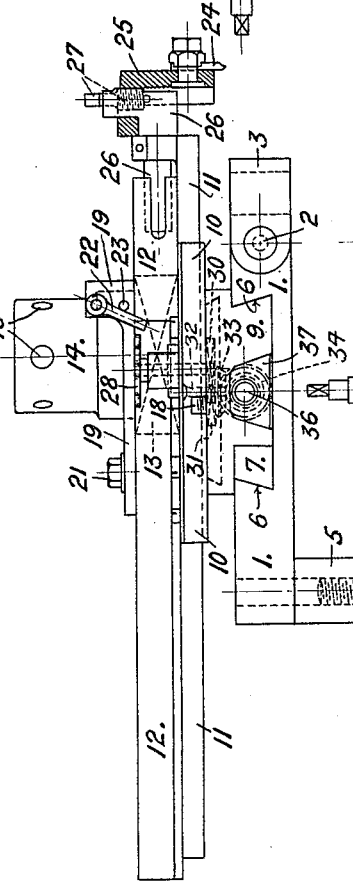
Figure 1 is an elevation of the machine or appliance.
Figure 3:
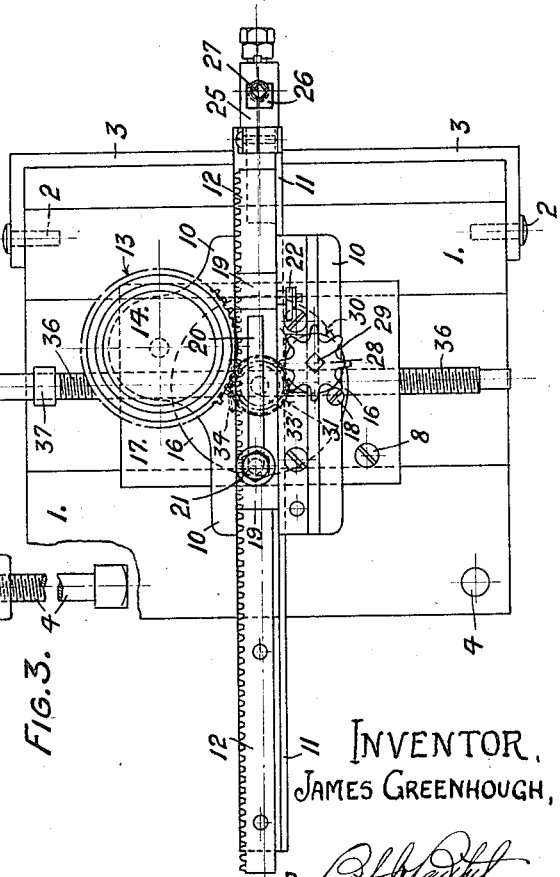
Fig. 3 is a plan view.

Referring to the drawings, but first more particularly to Figs. 1 to 3:—

There is provided a base or foundation plate or block 1, at the front whereof is adjustably attached—being hinged or pivoted on the bolts 2—a plate or bar 3 which is adapted to fit over and lie on the inner side of the near jaw member of a vise, so that when the article to be machined is placed between the far jaw of the vise and said plate 3 and the jaws are tightened up, the machine is securely clamped to the work in the vise.

The rear end of said plate 1 is supported by suitable lugs or standards which are preferably adjustable; in the example illustrated bolts 4 screwed into lugs 5 formed on the underside of the base plate 1 constitute such adjustable supports.

Arranged on said base plate 1, being movable between guide faces 6, 6 is a slide 9, to which is secured by means of a screw 8 a renewable side bar 7, and upon which is mounted a guide 10 of a reciprocable tool-carrying rod or bar 11 whereon is secured (or it may be integral with said rod) a toothed rack 12, which is in constant engagement with a pinion 13 revolubly disposed around a pin, the lower portion of which latter is secured in said slide 9. On said pinion 13 is formed or secured a capstan or turret head 14 wherein are formed a plurality of radial passages 15. Said guide 10 is integral with a circular plate or turntable 16 which is in part let into said slide 9 and in part positioned by the plate 17 screwed to slide 9 in order that the tool-carrying rod 11 together with the rack 12 and pinion 13 may be turned to any position required; when set, said turntable is secured by a screw 18.

Upon said rack 12 is disposed a bracket piece 19 wherein is formed a slot 20, said bracket being adjustably secured by means of a bolt 21, passing through said slot into the rack 12.

Bracket 19 carries a pawl or tappet 22 adapted to normally rest against a stop pin 23.

At one end of said rod 11 and rack 12 the tool 24 is secured, this being supported by a screw tapped piece 25 which is placed over a holder 26 provided with a screw threaded recess in which, and the tapped portion of the piece a screw pin 27 is fitted; by screwing said pin in one direction or the other the tool 24 may be elevated or depressed as desired. Any other suitable method of holding the tool may, however, be employed.

Upon said guide 10 is mounted a ratchet or tappet wheel 28 connected by means of a spindle 29 with a spur wheel 30; said wheel 30 in turn, meshes with a spur wheel 31 mounted on a spindle 32 which also carries a miter wheel 33 meshing with a miter wheel 34. Said latter miter wheel 34 forms part of a nut 35 which engages with the screw-threaded spindle 36 supported in bearings 37, so that on each actuation of said ratchet or tappet wheel 28 by said pawl 22 said slide and parts mounted thereon, are traversed a step laterally.

In use, on a rod being placed in one or other of said slots 15 of the capstan or turret head 14, and the head moved thereby, said rack 12, and with it the tool, is reciprocated to and fro over the work held in the vise. Then, on each return stroke of the rack said slide 9 and with it the tool, through the gearing before described is automatically moved a step laterally. If preferred however, the slide 9 with tool 24 may be traversed laterally by means of a key fitted on the squared end of shaft 36.

Figure 4:
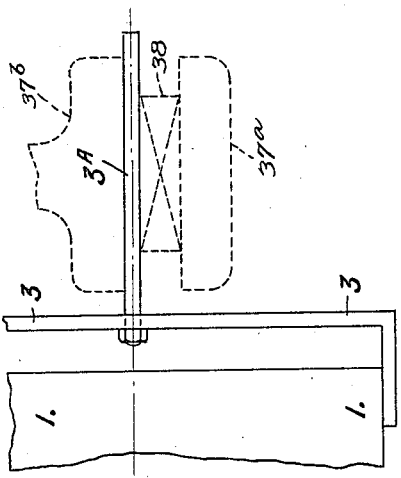
Fig. 4 illustrates a modification.

Referring to the modification illustrated in Fig. 4, in some cases it is desirable or necessary that the jaws of the vise be arranged at right angles to the bar 3, and to permit of this, there is secured to said bar 3 a plate or bar 3ª to which the vise jaws 37ᵇ, 37ª and work 38 are clamped.

In some cases I may employ suitable means for increasing or multiplying the motion of said rack actuating pinion.

Having now described my invention what I claim as new and desire to secure by Letters Patent is:—

A hand-actuated machine for metal planing, slotting, and like operations, comprising a slide on which is mounted a reciprocal member adapted to carry a tool and whereon is a toothed rack; a pinion revolubly mounted on said slide and in constant engagement with said rack, a head piece on said pinion; means for effecting lateral traverse of said slide, comprising a screw threaded spindle, which is engaged by a nut arranged on the underside of said slide; and means whereby said screwed spindle—and so the slide—may be actuated step by step through the reciprocal movement of said rack.

In testimony whereof I affix my signature in the presence of two witnesses.

JAMES GREENHOUGH.

Witnesses:
   JOHN H. WALKER,
   HUGH H. WATSON.

Copies of this patent may be obtained for five cents each, by addressing the "Commissioner of Patents, Washington, D. C."